Patented June 13, 1939

2,162,386

UNITED STATES PATENT OFFICE 2,162,386

PROCESS FOR THE MANUFACTURE OF INSULATING BODIES

Bruno Neuhof, Berlin, Germany

No Drawing. Application December 30, 1935, Serial No. 56,720. In Germany July 4, 1934

5 Claims. (Cl. 92—21)

Application has been filed in Germany July 4, 1934.

The present invention relates to processes for the manufacture of insulating bodies such as felts, cardboards, moulded pieces and the like.

The novel materials produced by the application of the invention possess a highly porous structure, this being due to the volume of the mineral wool (slag wool) which in volume always constitutes by far the greatest part of the materials, together with the air enclosed by said mineral wool.

According to the novel process the mineral wool is converted by wetting-out into a mass of large volume and thereupon preferably with the use of binding and cementing materials is subjected to a moulding or shaping operation. In order that bodies having advantageous insulating and strength properties should be obtained, the moulding operation is effected in such manner that consolidation (increase of the density) of the mass does not take place. Mechanical pressure must not be employed in the moulding operation, and such binders and cements are to be chosen as do not shrink or only shrink very slightly, or the shrinking of the binders and cements must be counteracted by the addition of dispersing and moistening means.

In order to impart the desired shape to the wetted-out mineral wool, which constitutes a loose felt, a pouring or casting process, or a plastic shaping by hand and filling into suitable moulds can be employed. It is particularly advantageous to pour or bring the wetted-out mass, which contains a considerable amount of water, into moulds having porous walls, or to bring it on to sieves or filtering layers, in order to be able to remove a certain amount of water from the mass during the shaping or moulding.

As binders and cements it is possible to employ for example: wetted-out cements, such as Portland cement and the like, wetted-out mixtures of lime and substances containing silicic acid capable of reacting, wetted-out gypsum, waterglass or other gel-forming masses, emulsions of bitumen, resin soaps, waste cellulose lyes and glues.

In working with the cements the addition of substances which assist reaction, such as calcium chloride and the like, is to be recommended. When waterglass is employed, a separation of or precipitation of silicic acid gel or insoluble alkaline earth silicate and the like can be effected. When glues are employed an addition of or after-treatment with formaline is advantageous for the purpose of increasing the rate of setting and hardening and the resistance to water. When emulsions are employed, treatment with flaking means is advisable.

The final setting can be accelerated by treatment with hot air, steam, carbonic acid and the like. Shrinking of the binders is to be counteracted by the addition of dispersing means, i. e. gas developing substances such as hydrogen peroxide, metallic powders, alkaline carbonates, and ammonium salts together with substances having an acid reaction, calcium carbide and dicyandiamide. In order to obtain the best result, care should also as far as possible be taken to see that such gas developing substances are present as wholly or partly, even during the drying or hardening treatment respectively, set free gases.

It is preferable to add to the wetted-out mineral wool, substances exerting a moistening action or increasing the viscosity and to carry out the preparation of the wetted-out mixture in a colander or forming cylinder, a mixing device or similar apparatus, in such manner that the mineral wool is worked up into a loose felt-like mass with the formation of air bubbles. Suitable moistening substances, which may be employed either alone or also in addition to other binders, are, for example, resin soaps, waste cellulose lyes, glues and insoluble soaps, from which wetted-out mixtures capable of being applied by pasting can be produced with 80-85% of water. The increase of the viscosity of the water wetted-out mixture is particularly desirable when means developing gases are employed, in order to prevent escape of the gases developed in the mass.

The proportion of the aforesaid means developing gases to be added should be at least sufficiently large to enable the resultant loosening action to equalise the shrinking.

The object which is always aimed at herein is the maintenance of the volume of the wetted-out mineral wool, inasmuch as any consolidating treatment including any shrinking of the binders and cements causes the mass to become brittle and renders it necessary either to employ large quantities of binder (thus increasing the weight per unit volume) or to be content with considerable losses as regards the strength and elasticity of the products.

The following mode of operation has been found particularly advantageous:

The mineral wool is wetted-out with water and is placed on a sieve or a filter of the desired shape. Then the binders and cements are added which, owing to the suction action of the filter, are sucked into the mineral wool. Substances may be employed which immediately develop, by chemical action, gels in succession, which latter rapidly pass over into the solid state, for example, waterglass from which by the action of carbonic acid or other acids, silicic acid gel or by the addition of earth alkaline compounds, calcium silicate, is precipitated, or aluminium salt solutions from which by means of lime or alkalis, alumina is precipitated in gel form.

When the aforesaid binding means are employed a special addition of dispersing or moistening means is not necessary.

Gels or substances forming gels by chemical reaction with one another can be incorporated with the mineral wool at any desired stage in the manufacture of moulded bodies. Since the gels possess a large volume for a small content of solid matter, a wetting out treatment is, in this case, unnecessary, and it is also possible to replace the mineral wool entirely or partly by other finely divided materials also capable of automatically hardening or setting. Such materials are, for example, clay, gypsum, cements, kieselguhr, sand- and slag flour, and mixtures containing these materials.

According to the above described process, both masses and also moulded bodies having a structure which is uniform throughout can be obtained. It is, however, also possible to produce moulded bodies made up of a plurality of layers. Bodies having a particularly small weight per unit volume are obtained if only the masses intended for the outer layer have incorporated with them to a considerable extent binders or cements, whilst the inner layer only contains a small proportion of such binders and cements. For example, a mass may, in the first place, be prepared on the sieving machine having only a very small proportion of binders and then a mass with which binders are incorporated to a larger extent is applied to the first-named mass. With the above described method of shaping the material by sucking in, the layer formation can be brought about by varying the magnitude of the suction action.

External layers of solid constructional materials, such as, for example, concrete, gypsum or the like, may be applied. The said outer layers may consist of different constructional materials, for example one outer layer may be concrete and the other outer layer gypsum. Waterproof coatings of this kind can also be formed by applying or pouring on resins, artificial resins and the like. A wall of this kind having a thickness of 4 to 5 cm. with a middle layer of a mineral wool felt of 2 cm. thickness, one outer layer of concrete and another outer layer of gypsum, has a heat conductivity figure of about .03. The inner layer of mineral wool felt should preferably only contain sufficient binder or cement to ensure that the felt is water-repellent, whilst the outer layer which is made denser, imparts to the finished product the necessary waterproof quality.

The mineral wool may also be entirely or partly replaced by other fibrous material of inorganic or organic nature, for example by fibrous asbestos, by wood fibre, by grindings, the greatest possible freedom from slimy substances being obtained by wool waste, cellulose and the like. It is advantageous to employ mixtures of fibrous materials of this kind with slag or mineral wool.

The novel moulded bodies are characterised by high heat and sound insulating properties, resistance to temperature, waterproofness, considerable mechanical strength and toughness and elasticity. Their weights per unit of volume can be reduced down to 100 to 200 kgs. per cubic meter. They are in many respects similar to cork and are superior to the latter in regard to many of their properties.

I claim:

1. In a process for the manufacture of insulating material from mineral wool fibers; the steps of wetting out mineral wool fibers with water, mixing a binding agent normally causing shrinkage with said mineral wool fibers, incorporating therein a chemical agent which increases the viscosity and lowers the surface tension of the water, incorporating gas bubbles in the mass, the agent and gas being in sufficient amounts to equalize and counteract the shrinkage which would normally be caused by the binder, working up the mass so obtained on sieves while water is being removed from it, and subjecting the mass so obtained to a shaping operation without mechanical pressure whereby the volume of said mass is substantially unchanged during the shaping operation.

2. The process set forth in claim 1 in which the chemical agent to increase the viscosity is waste cellulose lye.

3. The process set forth in claim 1 in which the chemical agent to increase the viscosity is a resin soap.

4. The process set forth in claim 1 in which the binding agent is a bituminous emulsion.

5. The process set forth in claim 1 in which the chemical agent to increase the viscosity forms a gel.

BRUNO NEUHOF.